United States Patent
Pinto et al.

(10) Patent No.: US 7,209,995 B2
(45) Date of Patent: Apr. 24, 2007

(54) EFFICIENT CONNECTION BETWEEN MODULES OF REMOVABLE ELECTRONIC CIRCUIT CARDS

(75) Inventors: Yosi Pinto, Palo Alto, CA (US); Aviad Zer, Cupertino, CA (US); Amir Tsuri, Cupertino, CA (US); Asher Druck, Nahariya (IL)

(73) Assignee: SanDisk Corporation, Milpitas, CA (US)

( * ) Notice: Subject to any disclaimer, the term of this patent is extended or adjusted under 35 U.S.C. 154(b) by 117 days.

(21) Appl. No.: 10/732,149

(22) Filed: Dec. 9, 2003

(65) Prior Publication Data

US 2005/0125584 A1 Jun. 9, 2005

(51) Int. Cl.
*G06F 13/00* (2006.01)
*G06F 13/12* (2006.01)
*G06F 13/42* (2006.01)

(52) U.S. Cl. .................. 710/301; 710/62; 710/305; 235/492

(58) Field of Classification Search .................. 710/23, 710/25, 27, 60, 110, 200, 301, 305; 711/163; 235/492; 702/186; 712/38
See application file for complete search history.

(56) References Cited

U.S. PATENT DOCUMENTS

| | | | |
|---|---|---|---|
| 4,455,620 A * | 6/1984 | Watanabe et al. | 710/27 |
| 4,458,313 A * | 7/1984 | Suzuki et al. | 710/23 |
| 4,614,144 A | 9/1986 | Sagara et al. | |
| 4,882,473 A | 11/1989 | Bergeron et al. | |
| 4,882,476 A | 11/1989 | White | |
| 5,067,075 A * | 11/1991 | Sugano et al. | 710/25 |
| 5,155,663 A | 10/1992 | Harase | |
| 5,375,037 A | 12/1994 | Le Roux | |
| 5,375,084 A | 12/1994 | Begun et al. | |
| 5,434,872 A | 7/1995 | Petersen et al. | |

(Continued)

FOREIGN PATENT DOCUMENTS

DE 4416583 7/1995

(Continued)

OTHER PUBLICATIONS

"Identification Cards—Integrated Circuit(s) Cards with Contracts—Part 1: Physical Characteristics," *ISO/IEC 7810—Second Edition*, pp. 1-5, Aug. 1995.

(Continued)

*Primary Examiner*—Christopher E. Lee
(74) *Attorney, Agent, or Firm*—Parsons Hsue & de Runtz LLP

(57) ABSTRACT

A removable electronic circuit card has multiple modules connected to the card's bus in parallel so that each module can exchange commands and data independently with the host. According to a first aspect of the present invention, this achieved by a controller-to-controller interface whereby the modules can facilitate their interactions with the host. In a first set of embodiments, the modules are on a single card, while in a second set of embodiments the modules are distributed across multiple cards, where a first card attaches to the host and other cards attach to the first card rather than directly to the host. In all of these cases, the host sees the multiple modules as a single card having a single module. In a further aspect of the present invention, the card or cards are able to communicate with the host in more than one protocol.

12 Claims, 11 Drawing Sheets

U.S. PATENT DOCUMENTS

| | | |
|---|---|---|
| 5,438,359 A | 8/1995 | Aoki |
| 5,457,601 A | 10/1995 | Georgopulos et al. |
| 5,486,687 A | 1/1996 | Le Roux |
| 5,513,074 A | 4/1996 | Ainsbury et al. |
| 5,563,400 A | 10/1996 | Le Roux |
| 5,606,559 A | 2/1997 | Badger et al. |
| 5,655,917 A | 8/1997 | Kaneshige et al. |
| 5,677,524 A | 10/1997 | Haghiri-Tehrani |
| 5,727,168 A | 3/1998 | Inoue |
| 5,733,800 A | 3/1998 | Moden |
| 5,742,910 A | 4/1998 | Gallant et al. |
| 5,752,857 A | 5/1998 | Knights |
| 5,764,896 A | 6/1998 | Johnson |
| 5,780,837 A | 7/1998 | Garcia |
| 5,780,925 A | 7/1998 | Cipolla et al. |
| 5,784,633 A * | 7/1998 | Petty ............................ 710/60 |
| 5,802,325 A | 9/1998 | Le Roux |
| 5,809,520 A | 9/1998 | Edwards et al. |
| 5,822,190 A | 10/1998 | Iwasaki |
| 5,831,256 A | 11/1998 | De Larminat et al. |
| 5,831,533 A | 11/1998 | Kanno |
| 5,837,984 A | 11/1998 | Bleier et al. |
| 5,852,290 A | 12/1998 | Chaney |
| 5,877,488 A | 3/1999 | Klatt et al. |
| 5,887,145 A | 3/1999 | Harari et al. |
| 5,909,596 A | 6/1999 | Mizuta |
| 5,928,347 A | 7/1999 | Jones |
| 5,933,328 A | 8/1999 | Wallace et al. |
| 5,974,496 A | 10/1999 | Miller |
| 5,975,584 A | 11/1999 | Vogt |
| 5,987,557 A * | 11/1999 | Ebrahim ..................... 710/200 |
| 6,040,622 A | 3/2000 | Wallace |
| 6,062,480 A * | 5/2000 | Evoy ........................... 235/492 |
| 6,062,887 A | 5/2000 | Schuster et al. |
| 6,069,795 A | 5/2000 | Klatt et al. |
| 6,075,706 A | 6/2000 | Learmonth et al. |
| 6,097,605 A | 8/2000 | Klatt et al. |
| 6,125,409 A | 9/2000 | Le Roux |
| 6,137,710 A | 10/2000 | Iwasaki et al. |
| 6,140,695 A | 10/2000 | Tandy |
| 6,145,046 A | 11/2000 | Jones |
| 6,151,511 A | 11/2000 | Cruciani |
| 6,151,652 A | 11/2000 | Kondo et al. |
| 6,175,517 B1 | 1/2001 | Jigour et al. |
| 6,199,756 B1 | 3/2001 | Kondo et al. |
| 6,202,109 B1 | 3/2001 | Salo et al. |
| 6,226,202 B1 | 5/2001 | Kikuchi |
| 6,240,301 B1 | 5/2001 | Phillips |
| 6,244,894 B1 | 6/2001 | Miyashita |
| 6,266,724 B1 | 7/2001 | Harari et al. |
| 6,279,114 B1 | 8/2001 | Toombs et al. |
| 6,311,296 B1 | 10/2001 | Congdon |
| 6,353,870 B1 | 3/2002 | Mills et al. |
| 6,381,662 B1 | 4/2002 | Harari et al. |
| 6,385,677 B1 | 5/2002 | Yao et al. |
| 6,405,278 B1 | 6/2002 | Liepe |
| 6,421,246 B1 | 7/2002 | Schremmer |
| 6,434,648 B1 | 8/2002 | Assour et al. |
| 6,438,638 B1 | 8/2002 | Jones et al. |
| 6,446,177 B1 * | 9/2002 | Tanaka et al. .............. 711/163 |
| 6,457,647 B1 | 10/2002 | Kurihashi et al. |
| 6,496,381 B1 | 12/2002 | Groeger |
| 6,499,016 B1 | 12/2002 | Anderson |
| 6,524,137 B1 | 2/2003 | Liu et al. |
| 6,612,498 B1 | 9/2003 | Lipponen et al. |
| 6,651,131 B1 | 11/2003 | Chong et al. |
| 6,665,190 B2 | 12/2003 | Clayton et al. |
| 6,669,487 B1 | 12/2003 | Nishizawa et al. |
| 6,676,420 B1 | 1/2004 | Liu et al. |
| 6,687,778 B2 | 2/2004 | Ito et al. |
| 6,745,247 B1 | 6/2004 | Kawan et al. |
| 6,748,457 B2 | 6/2004 | Fallon et al. |
| 6,764,017 B2 * | 7/2004 | Chen et al. .................. 235/492 |
| 6,816,933 B1 * | 11/2004 | Andreas ....................... 710/110 |
| 6,832,281 B2 | 12/2004 | Jones |
| 6,842,652 B2 | 1/2005 | Yeung |
| 6,842,818 B2 | 1/2005 | Okamoto et al. |
| 6,845,421 B2 * | 1/2005 | Hwang et al. ............... 710/305 |
| 6,862,604 B1 | 3/2005 | Spencer et al. |
| 6,886,083 B2 | 4/2005 | Murakami |
| 6,945,461 B1 | 9/2005 | Hien et al. |
| 2001/0001507 A1 | 5/2001 | Fukuda et al. |
| 2001/0021956 A1 | 9/2001 | Okamoto et al. |
| 2001/0042149 A1 | 11/2001 | Ito et al. |
| 2002/0103988 A1 * | 8/2002 | Dornier ......................... 712/38 |
| 2003/0056050 A1 * | 3/2003 | Moro ........................... 710/301 |
| 2003/0074529 A1 | 4/2003 | Crohas |
| 2003/0084221 A1 | 5/2003 | Jones et al. |
| 2003/0163623 A1 | 8/2003 | Yeung |
| 2004/0103234 A1 * | 5/2004 | Zer et al. ..................... 710/301 |
| 2004/0201745 A1 | 10/2004 | Wess et al. |
| 2005/0107987 A1 * | 5/2005 | Barr et al. ................... 702/186 |

FOREIGN PATENT DOCUMENTS

| | | |
|---|---|---|
| DE | 198 55 596 A | 6/2000 |
| EP | 495216 A2 | 7/1992 |
| EP | 495216 A3 | 7/1992 |
| EP | 0 657 834 A1 | 6/1995 |
| EP | 0 891 047 A2 | 1/1999 |
| EP | 1 001 348 A2 | 5/2000 |
| EP | 1037159 A2 | 9/2000 |
| EP | 1074906 A1 | 2/2001 |
| EP | 1085516 A2 | 3/2001 |
| EP | 1278154 A1 | 1/2003 |
| FR | 2771199 A | 5/1999 |
| GB | 2374204 A | 10/2002 |
| JP | 60234286 | 11/1985 |
| JP | 3195052 | 8/1991 |
| JP | 5-89304 | 4/1993 |
| JP | 5089304 | 4/1993 |
| JP | 6103429 | 4/1994 |
| JP | 6223241 | 8/1994 |
| JP | 6231318 | 8/1994 |
| JP | 7094658 | 4/1995 |
| JP | 2001282712 A * | 10/2001 |
| JP | 2001-307801 | 11/2001 |
| JP | 2002245428 A * | 8/2002 |
| JP | 2003196624 A * | 7/2003 |
| NL | 9301540 | 3/1995 |
| WO | 00/70553 | 11/2000 |
| WO | 00/70554 | 11/2000 |
| WO | 01/84490 A1 | 11/2001 |
| WO | 02/013021 A3 | 2/2002 |
| WO | 02/15020 | 2/2002 |
| WO | 02/19266 A2 | 3/2002 |
| WO | WO 02/19266 A2 | 3/2002 |
| WO | 2004/044755 A2 | 5/2004 |
| WO | WO 2004/049177 | 6/2004 |
| WO | WO2004/095365 A1 | 11/2004 |

OTHER PUBLICATIONS

"Information Technology—Identification Cards—Integrated Circuit(s) Cards with Contracts—Part 2: Dimensions and Location of the Contracts," *ISO-IEC 7816-2 First Edition*, pp. 1-5, Mar. 1, 1999.

"Information Technology—Identification Cards—Integrated Circuit(s) Cards with Contracts—Part 1: Electronic Signals and Transmission Protocols," *ISO-IEC 7816-3 Second Edition*, pp. 1-27, Dec. 15, 1997.

SanDisk Multimeda Product Manual, Rev. 2 © 2000 SanDisk Corporation, pp. 2-86.

MultiMediaCard System Specification Version 3.1 Official Release © Jan. 2000 MMCA Technical Committee, pp. 2-123.

"Palm Brand Products to Feature Secure Digital (SD) Card Slot for Expansion," SD Card Association—Press Room, www.sdcard.org/press7.htm, dated Jun. 27, 2000, 4 pages.

International Search Report issued for PCT/US2004/040122, mailed Apr. 1, 2005.

Written Opinion issued for PCT/US2004/040122, mailed Apr. 1, 2005.

Notification of Transmittal of the International Search Report and the Written Opinion of the International Searching Authority, or the Declaration, International Application No. PCT/US2004/040952 for SanDisk Corporation, mailed Apr. 29, 2005, 11 pages.

Office Action for U.S. Appl. No. 10/741,147 mailed Nov. 23, 2005, 24 pages.

Official Notification of the Intellectual Property Office for Taiwanese Application No. 93138176 mailed Oct. 5, 2005, 2 pages.

Office Communication for European Patent Application No. 03783177.3 mailed Sep. 14, 2005, 4 pages.

Office Action for U.S. Appl. No. 10/418,910 mailed Oct. 14, 2005, 16 pages.

Notification Concerning Transmittal of Copy of International Search Report on Patentability for International Application No. PCT/US2004/007782 mailed Nov. 28, 2005, 11 pages.

Office Action for U.S. Appl. No. 10/302,009 mailed Sep. 6, 2005, 17 pages.

MultiMediaCard System Specification Version 2.2 Official Release © Jan. 2000 MMCA Technical Committee, pp. 2-123.

Palm Brand Products to Feature Secure Digital (SD) Card Slot for Expansion, SD Card Association, N.Y., N.Y. 2001; www.sdcard.org/press7.html,4 pages.

ETSI, "Digital Cellular Telecommunications System (Phase 2+); Specification of the Subscriber Identity Module—Mobile Equipment (SIM-ME) Interface," GSM 11.11 Version 8.3.0 Release 1999, ETSI TS 100 977 V8.3.0 (Aug. 2000), pp. 1-170.

CompactFlash Association, "CF+ and CompactFlash Specification Revision 1.4", Jul. 1999, pp 1-105.

"Identification Cards—Integrated Circuit(s) Cards with Contacts: Part 10: Electronic Signals and Answer to Reset for Synchronous Cards," International Standard, ISO/IEC 7816-10, Nov. 1, 1999, 13 pages.

MMCA Technical Committee, "The MultiMediaCard System Specification, Version 3.1", Jun. 2001, pp. 1-130.

"Olympus Camedia; Accessories at a Glance", http://www.bicos.de/media/Olympus-Zubeh%F6r.pdf, Sep. 9, 2002, 18 pages.

"Communication Relating to the Results of the Partial International Search", European Patent Office, International Searching Authority, related to corresponding application PCT/US03/35325, Jul. 2, 2004, 6 pages.

European Patent Office, International Searching Authority, "Partial International Search," from related PCT/US2004/007782, dated Oct. 8, 2004, 4 pages.

SD Group, "SD Memory Card Specifications, Simplified Version of: Part 1 Physical Layer Specification, Version 1.01," Apr. 15, 2001, pp. 1-32.

International Search Report for PCT/US01/27362, dated Feb. 25, 2002, 3 pages.

"Identification Cards—Integrated Circuit(s) Cards with Contracts—Part 1: Physical Characteristics," *ISO/IEC 7816-1 First Edition*, pp. 1-3, Oct. 15, 1998.

Wilson, James Y., et al., "Inside Bluetooth—Part 1," *Dr. Dobb's Journal*, pp. 62-70, Mar. 2000.

Wilson, James Y., et al., "Inside Bluetooth—Part 2," *Dr. Dobb's Journal*, pp. 58-64, Apr. 2000.

MultiMediaCard System Specification Version 2.11 Official Release © Jun. 1999 MMCA Technical Committee, pp. 2-123.

ISA/EPO, "International Search Report," mailed in related PCT/US03/35325, mailed Oct. 13, 2004, 9 pages.

"Olympus Camedia; Accessories at a Glance", http://www.bicos.de/media/Olympus-Zubeh%F6r.pdf, May 6, 2004, 18 pages.

EPO/ISA, "International Search Report and Written Opinion," mailed Oct. 13, 2004 in corresponding PCT/US2004/007782, 15 pages.

"Partial International Search Report," EPO International Searching Authority, mailed Aug. 10, 2004 in corresponding PCT Application No. PCT/US2004/007782, 4 pages.

"MultiMedia Card Product Manual, Revision 2," SanDisk Corporation, Apr. 2000, pp. 1-86.

"Identification Cards—Physical Characteristics," ISO/IEC 7810 International Standard, Aug. 15, 1995, pp. 1-5.

"Information Technology—Identification Cards—Integrated Circuit(s) Cards with Contracts, Part 3: Electronic Signals and Transmission Protocols," ISO/IEC 7816-3 International Standard, 1997, pp. 1-27.

"Information Technology—Identification Cards—Integrated Circuit(s) Cards with Contracts, Part 2: Dimensions and Location of the Contracts," ISO/IEC 7816-2 International Standard, 19997, pp. 1-5.

Office Action for U.S. Appl. No. 10/293,985 mailed Jan. 9, 2006, 15 pages.

Office Action for U.S. Appl. No. 11/075,438 mailed Jan. 24, 2006, 9 pages.

Office Action for U.S. Appl. No. 10/741,147 mailed Jul. 25, 2006, 18 pages.

Office Action for U.S. Appl. No. 10/302,009 mailed Jun. 7, 2006, 15 pages.

Office Action for U.S. Appl. No. 11/303,220 mailed Oct. 13, 2006, 12 pages.

* cited by examiner

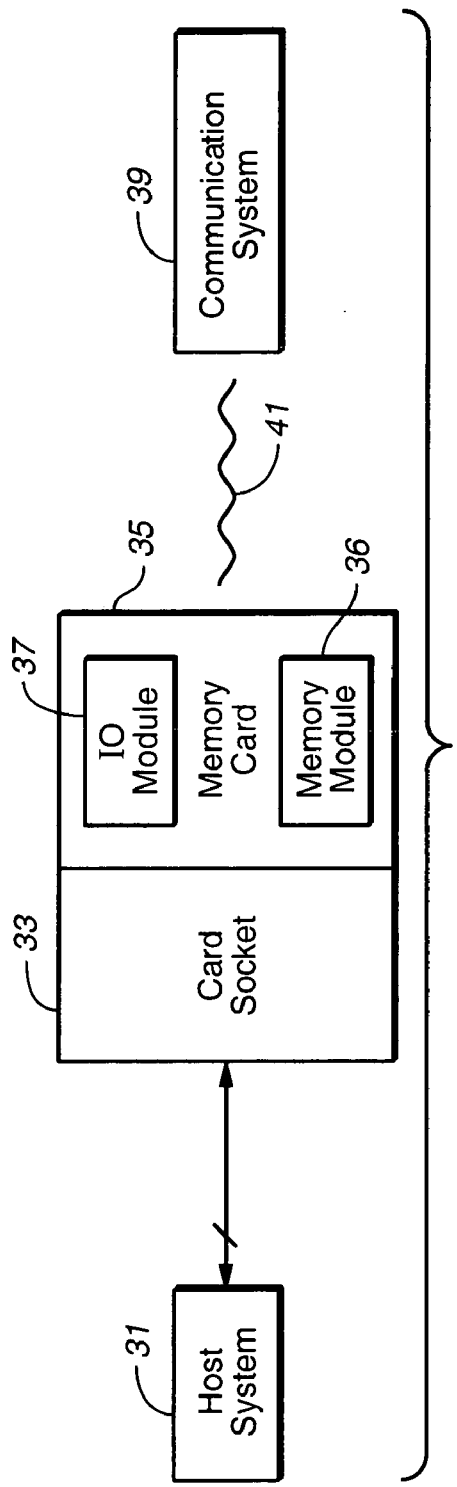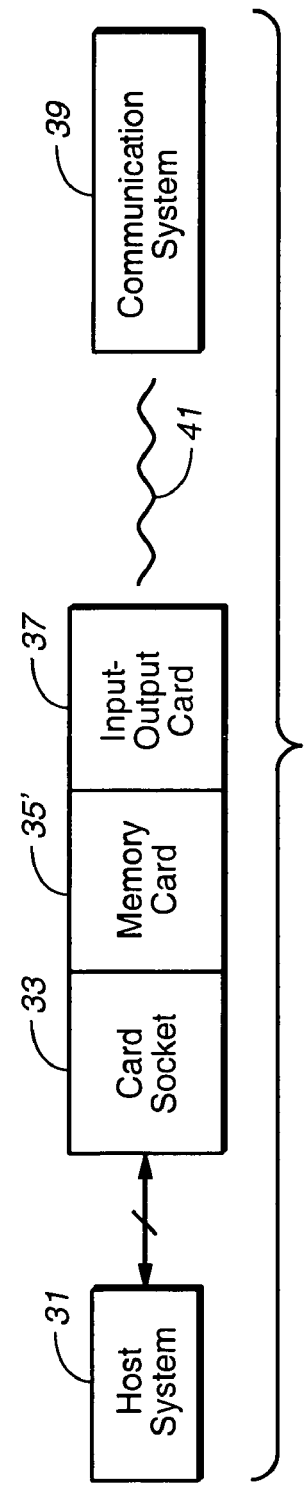

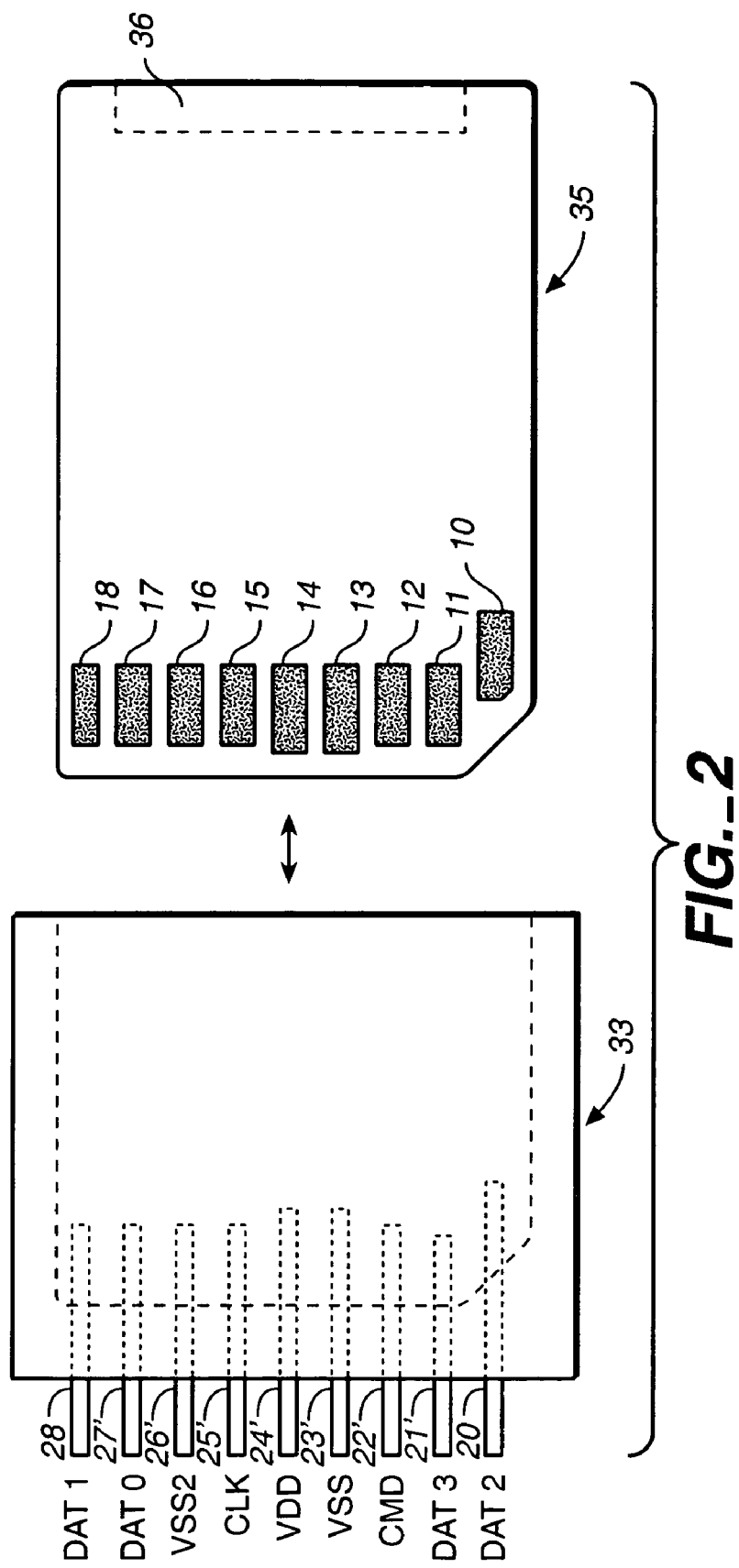
FIG._2

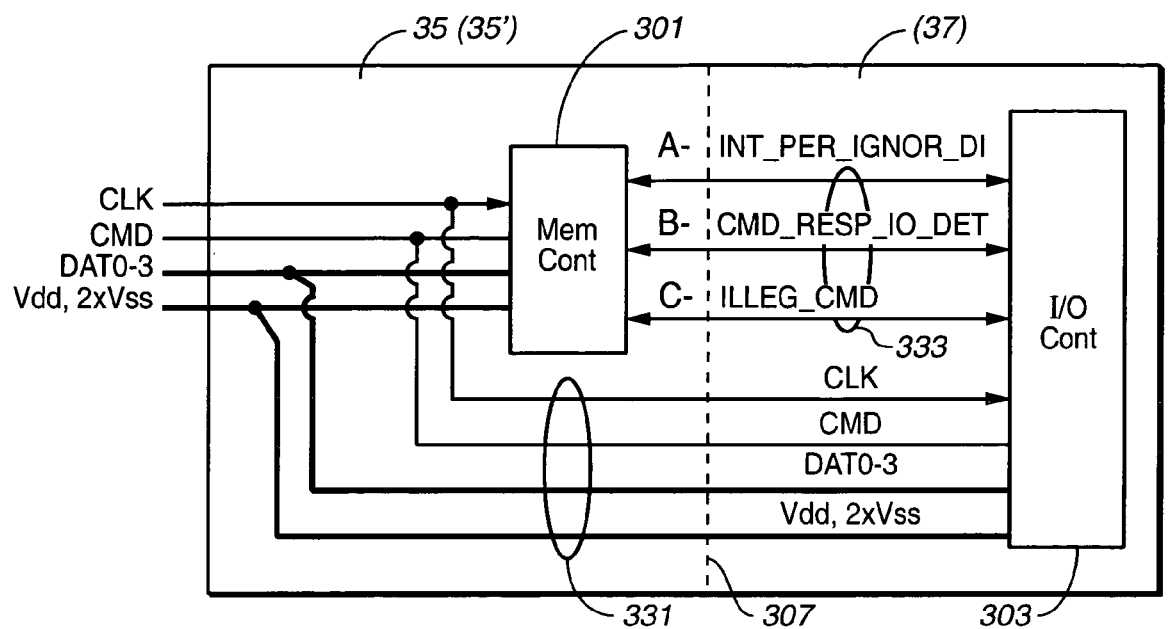
FIG._3
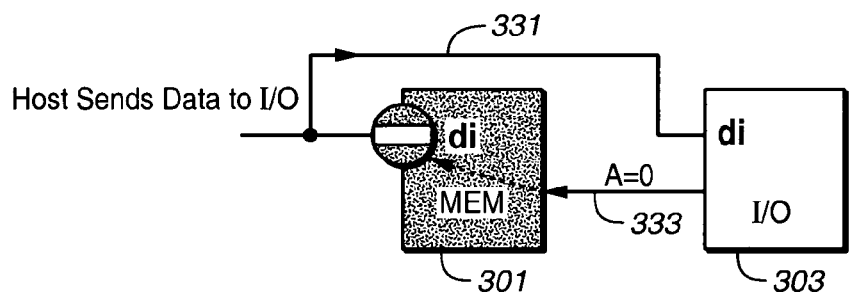
FIG._4a
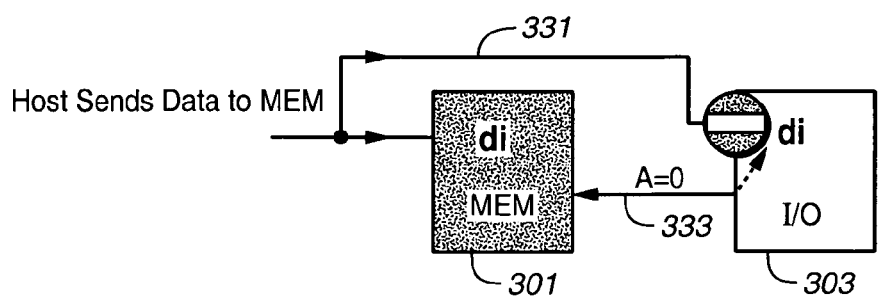
FIG._4b

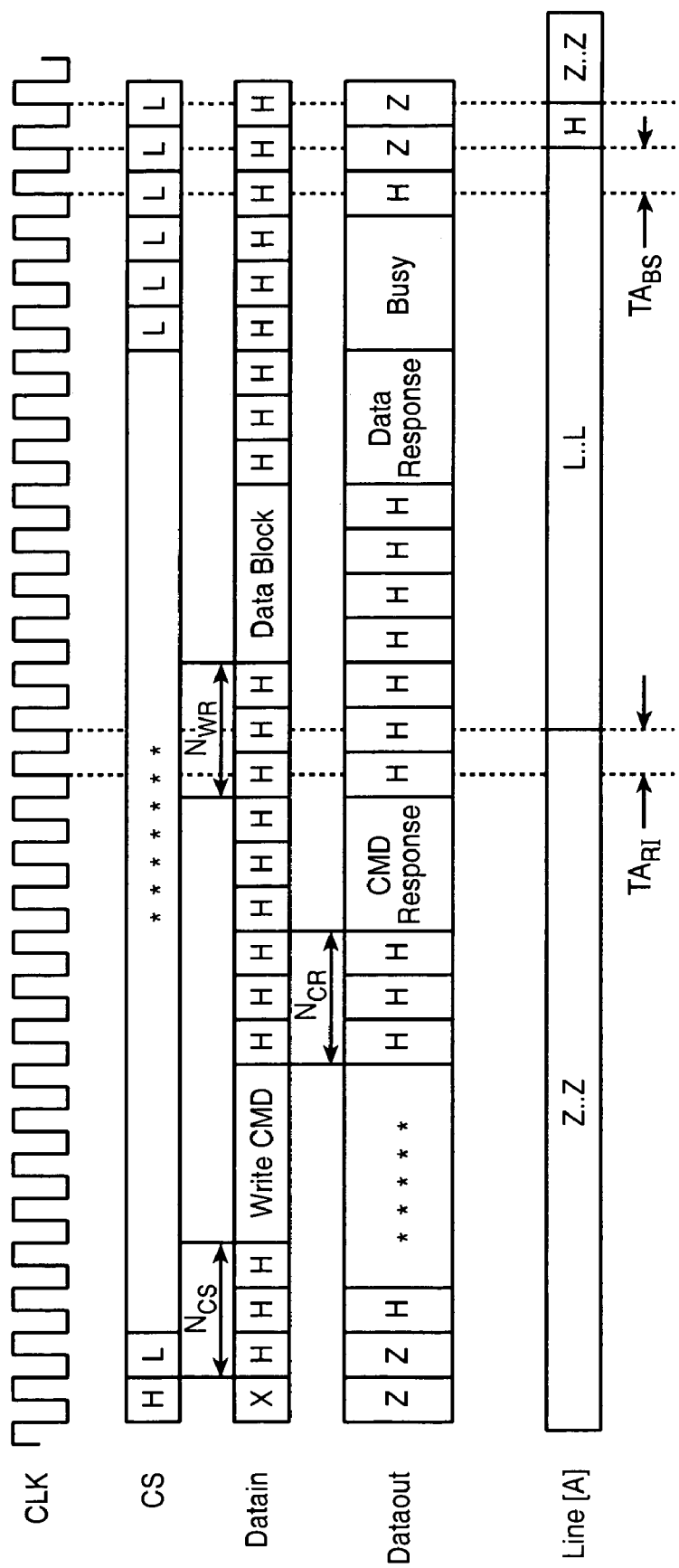
FIG._5

| | |
|---|---|
| S | Start bit (='0') |
| H | Signal is Driven HIGH by the Card |
| Z | High Impedance State, Line is Driven HIGH by the Pull-up Resistor |
| L | Signal is Driven LOW by the Card |
| X | Don't Care Data Bits (from Card) |
Table 1: Timing Diagram Symbols
FIG._6
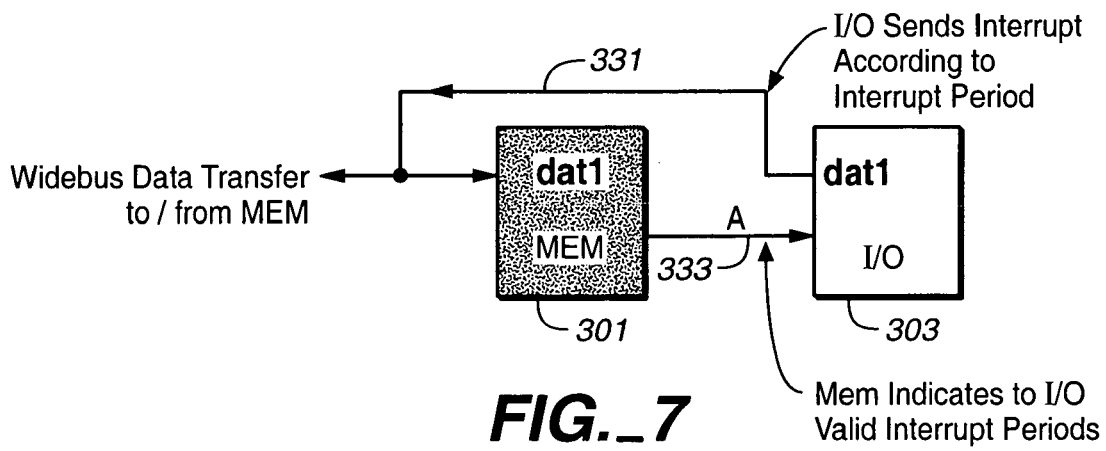
FIG._7
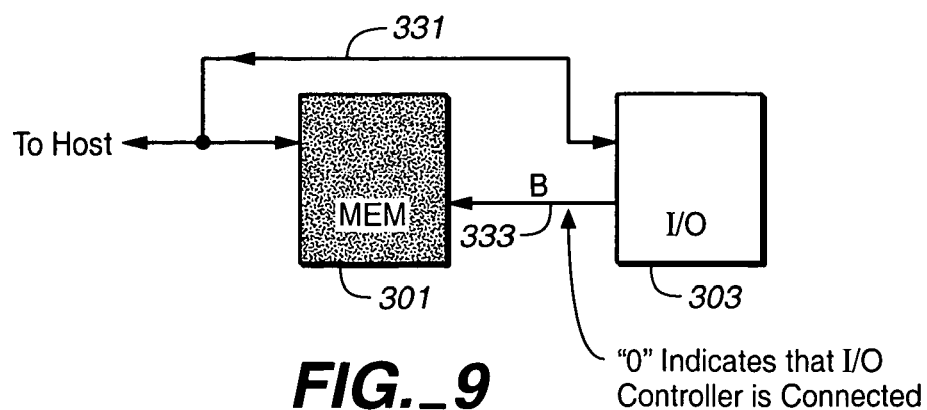
FIG._9

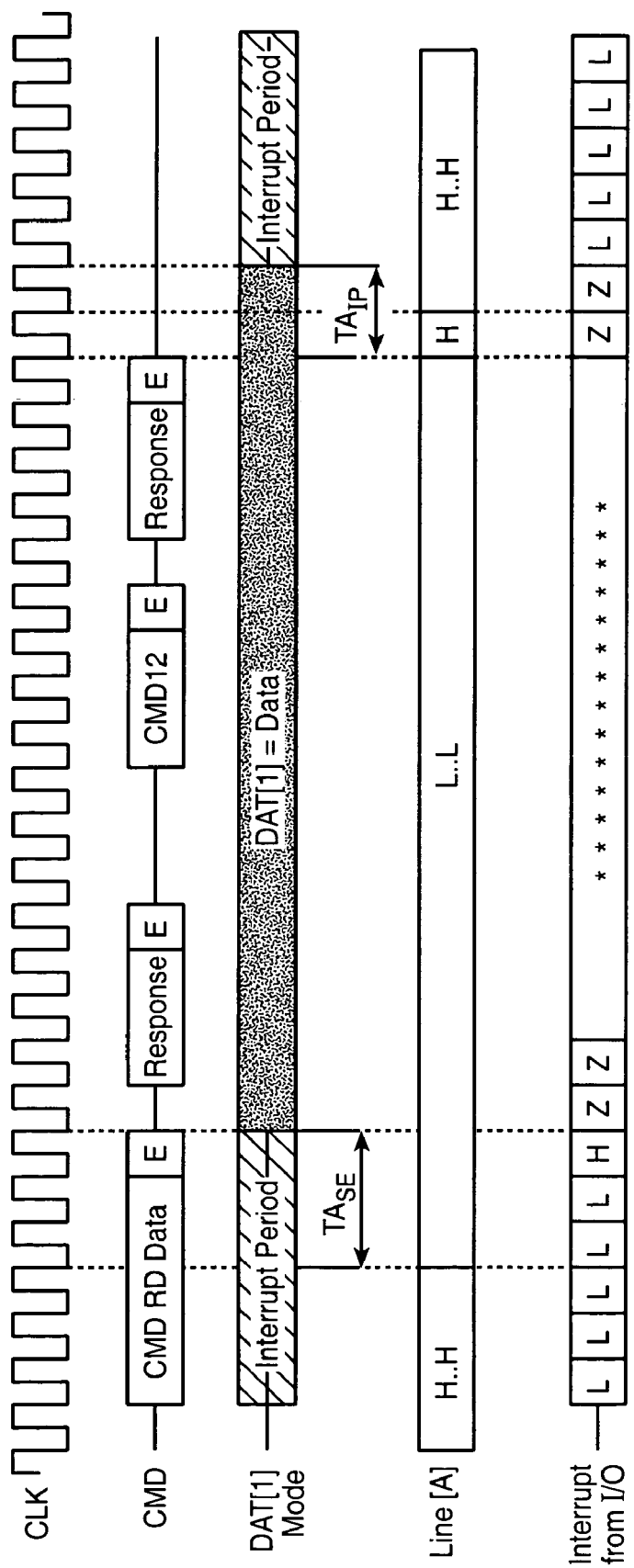
FIG._8

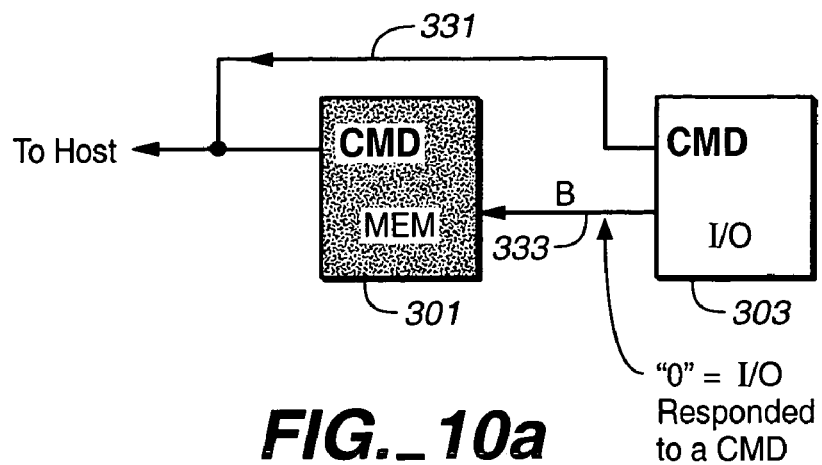
FIG._10a
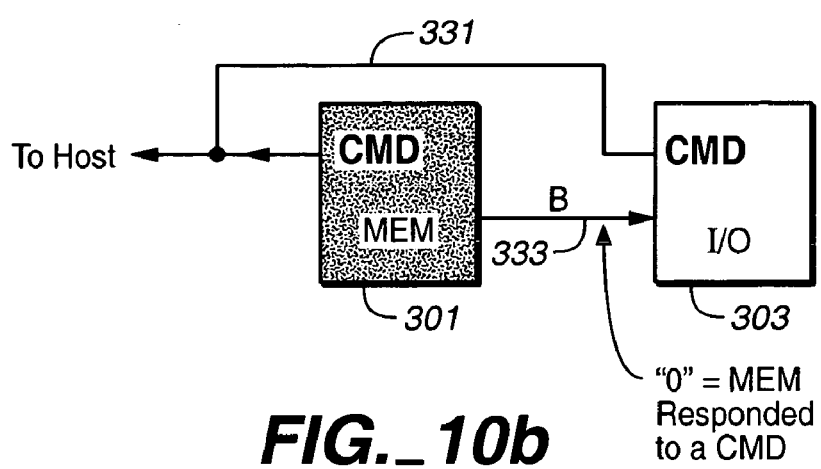
FIG._10b
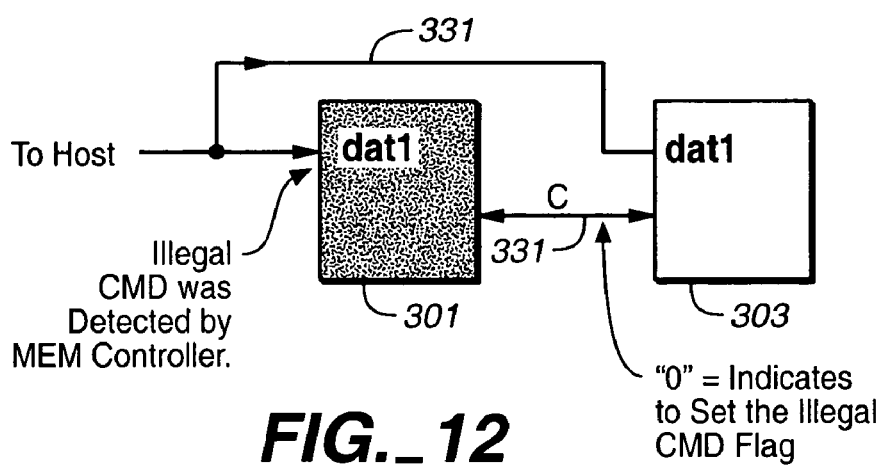
FIG._12

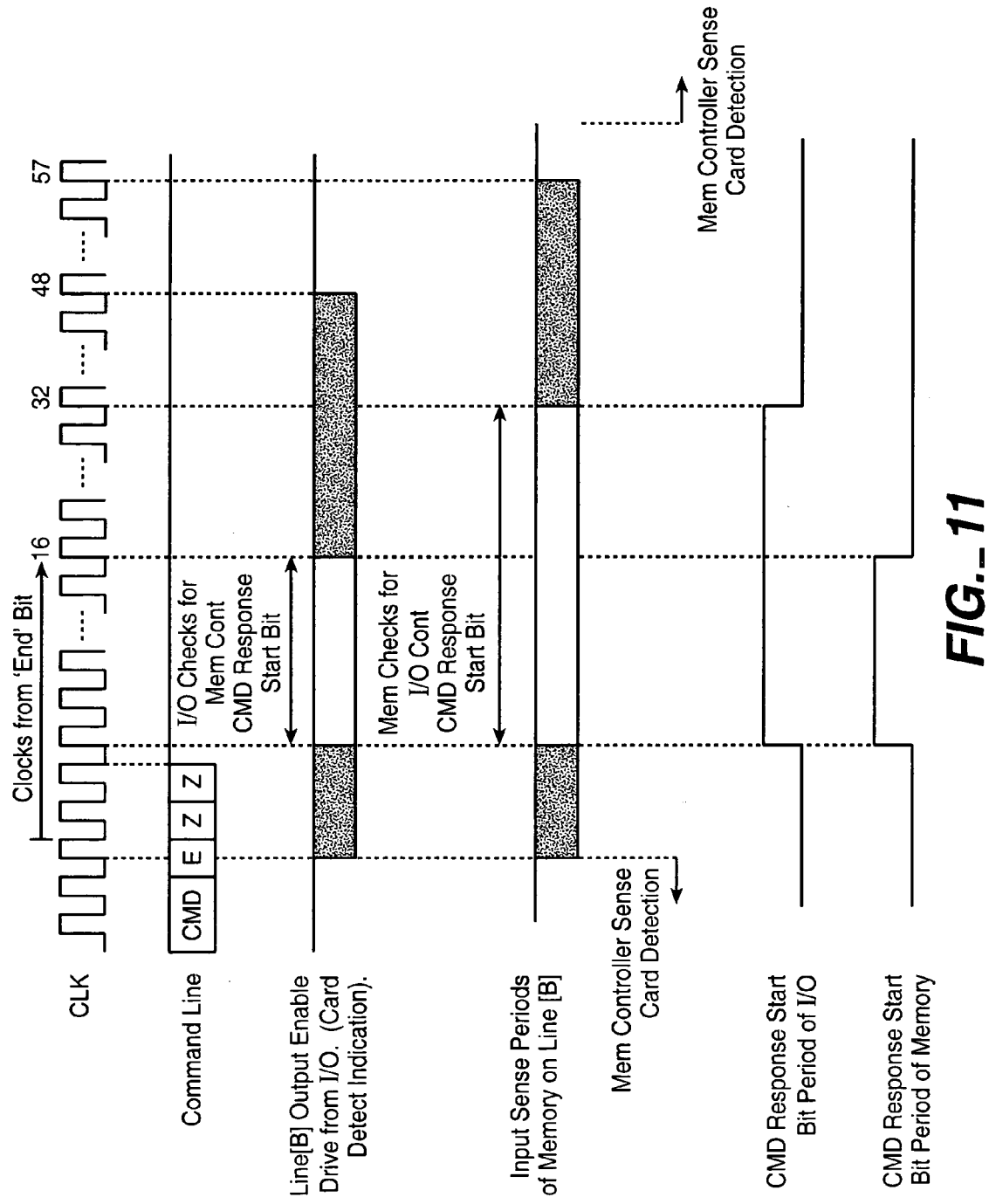
FIG._11

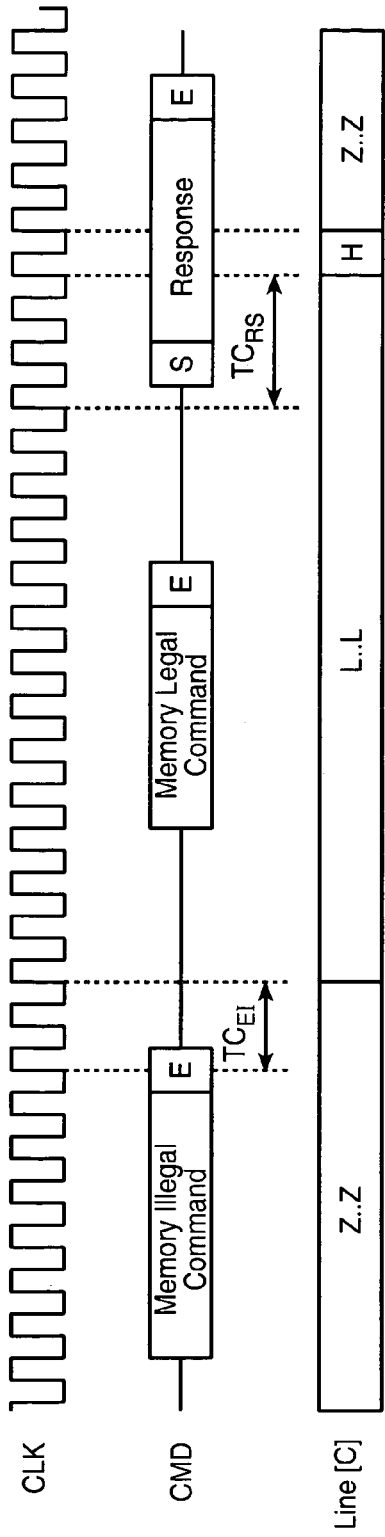
FIG._13
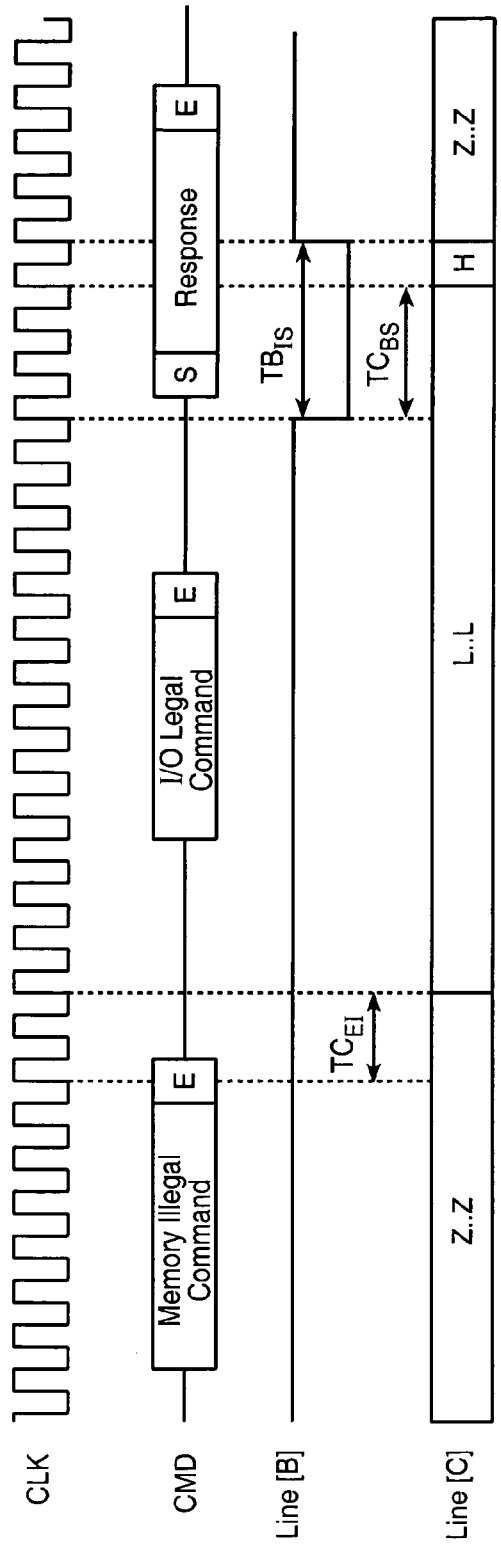
FIG._14

| Label | Min | Max | Unit |
|---|---|---|---|
| $N_{CS}$ | 0 | - | 8 Clock Cycles |
| $N_{CR}$ | 1 | 8 | 8 Clock Cycles |
| $N_{WR}$ | 1 | - | 8 Clock Cycles |
| $TA_{RI}$ | 1 | 1 | 1 Clock Cycle |
| $TA_{BS}$ | 1 | 1 | 1 Clock Cycle |
| $TA_{SE}$ | 3 | 3 | 1 Clock Cycle |
| $TA_{IP}$ | 2 | 2 | 1 Clock Cycle |
| $TB_{IS}$ | 4 | 4 | 1 Clock Cycle |
| $TC_{BS}$ | 1 | 5 | 1 Clock Cycle |
| $TC_{RS}$ | - | 3 | 1 Clock Cycle |
| $TC_{EI}$ | 0 | 3 | 1 Clock Cycle |
Table 2: Bus Timing Values
*FIG._15*
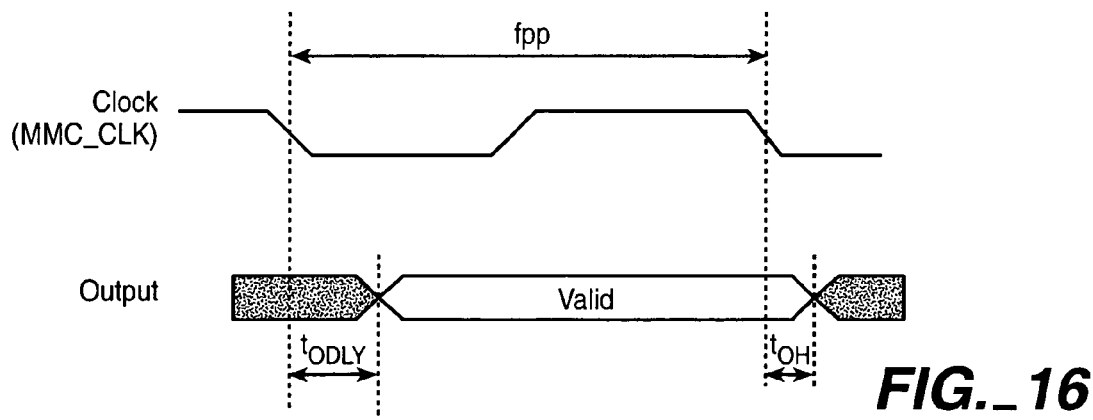
*FIG._16*
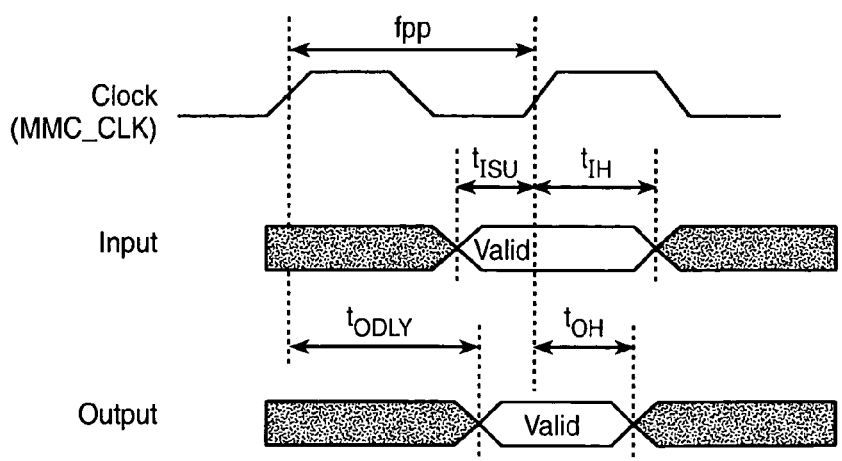
*FIG._17*

| Parameter | Symbol |
|---|---|
| Output Delay Time | $t_{ODLY}$ |
| Output Hold Time | $t_{OH}$ |

Table 3: Line [A] in SD Mode - Parameters Values

FIG._18

| Parameter | Symbol |
|---|---|
| Input Set-up Time | $T_{ISU}$ |
| Input Hold Time | $T_{IH}$ |
| Output Delay Time | $t_{ODLY}$ |
| Output Hold Time | $t_{OH}$ |

Table 4: Lines [B,C] in SD and SPI Mode,
Line [A] in SPI Mode - Parameters Values

FIG._19

| Pin | Description | |
|---|---|---|
| | Type | |
| P_CONT_A - INT_PER_IGNOR_DI | I/O, PU_PP 16mA | SD Mode - "H" = Interrupt Period; SPI Mode - "L" = DI Ignore |
| P_CONT_B - CMD_RESP_IO_DET | I/O, PU_PP 16mA | L - Out of CMD Response Period - Indicates I/O Card Detect; During CMD Response Period - Indicate to Clear Illegal CMD & COM CRC ERROR Flag |
| P_CONT_C - ILLEG_CMD | I/O, PU_PP 16mA | L - Indicate that Illegal CMD Received |

Note: (1) Output Types - I/O = InputOutput, PP = Push-Pull, PU = Pullup

Table 5: Pin Description of the SDIO Interface

FIG._20

EFFICIENT CONNECTION BETWEEN MODULES OF REMOVABLE ELECTRONIC CIRCUIT CARDS

BACKGROUND OF THE INVENTION

This invention relates, generally, to the use and structure of removable electronic circuit cards and, more specifically, to the connections between card modules on either a single card or on individual cards.

Various commercially available non-volatile memory cards that are becoming popular are extremely small and have different mechanical and/or electrical interfaces. Examples include the related MultiMediaCard ("MMC") and Secure Digital ("SD") memory cards that are available from SanDisk Corporation of Sunnyvale, Calif., assignee of the present application. There are other cards that conform to standards of the International Organization for Standardization ("ISO") and the International Electrotechnical Commission ("IEC"), an example that is widely implemented being known as the ISO/IEC 7816 standard.

The physical and electrical specifications for the MMC are given in "The MultiMediaCard System Specification" that is updated and published from time-to-time by the MultiMediaCard Association ("MMCA") of Cupertino, Calif. Versions 2.11 2.2, and 3.1 of that Specification, dated June 1999, January 2000, and June 2001, respectively, are expressly incorporated herein by this reference. MMC products having varying storage capacity up to 128 megabytes in a single card are currently available from SanDisk Corporation. These products are described in a "MultiMediaCard Product Manual," Revision 2, dated April 2000, published by SanDisk corporation, which Manual is expressly incorporated herein by this reference. Certain aspects of the electrical operation of the MMC products are also described in co-pending patent applications of Thomas N. Toombs and Micky Holtzman, Ser. Nos. 09/185,649 and 09/186,064, both filed Nov. 4, 1998, and assigned to SanDisk Corporation. The physical card structure and a method of manufacturing it are described in U.S. Pat. No. 6,040,622, assigned to SanDisk Corporation. Both of these applications and patent are also expressly incorporated herein by this reference.

The newer SD Card is similar to the MMC card, having the same size except for an increased thickness that accommodates an additional memory chip. A primary difference between them is that the SD Card includes additional data contacts in order to enable faster data transfer between the card and a host. The other contacts of the SD Card are the same as those of the MMC card in order that sockets designed to accept the SD Card will also accept the MMC card. The electrical and functional interface with the SD card is further made in such a way that the sockets designed to accept the SD card can also be made to accept the MMC card, as is described in PCT published application number 02/15020 of Yoram Cedar, Micky Holtzman, and Yosi Pinto, published Feb. 21, 2002, and hereby incorporated by this reference. Certain aspects of the SD card are described in U.S. patent application Ser. No. 09/641,023, filed Aug. 17, 2000, which application is incorporated herein by this reference. (The specifications of the SD card are available to member companies of the SD Association (SDA).)

Cards made according to the ISO/IEC 7816 standard are of a different shape, have surface contacts in different positions, and a different electrical interface than the MMC and SD Cards. The ISO/IEC 7816 standard has the general title of "Identification cards-Integrated Circuit(s) Cards with Contacts," and consists of parts 1–10 that carry individual dates from 1994 through 2000. This standard, copies of which are available from the ISO/IEC in Geneva, Switzerland, is expressly incorporated herein by this reference. ISO/IEC 7816 cards are particularly useful in applications where data must be stored in a secure manner that makes it extremely difficult or impossible for the data to be read in an unauthorized manner. The small ISO/IEC 7816 cards are commonly used in cellular telephones, among other applications.

Recently, cards have been described that allow multiple modules having different functionalities to be attached to the host. These include a single card having multiple modules and cards where the modules are distributed between several cards, but where a first card attaches directly to the host and the other cards attach to the first card rather than directly to the host, such as is described in co-pending U.S. patent application Ser. No. 09/653,062, filed Sep. 1, 2000, which is hereby incorporated by reference. For example, the modules could include a memory module and an input-output module, where both modules are in a single, combination card, or where a memory card is designed to attached to the host on one end and attach to an input-output card on the other end. Such multi-module cards need to be designed so that they may operate with the host in a fast, efficient and convenient manner.

SUMMARY OF THE INVENTION

Therefore, the present invention, briefly and generally, utilizes a removable electronic circuit card having multiple modules connected to the card's bus in parallel so that each module can exchange commands and data independently with the host. According to a first aspect of the present invention, this achieved by a controller-to-controller interface whereby the modules can facilitate their interactions with the host. In a first set of embodiments, the modules are on a single card, while in a second set of embodiments the modules are distributed across multiple cards, where a first card attaches to the host and other cards attach to the first card rather than directly to the host. In all of these cases, the host sees the multiple modules as a single card having a single module. In a further aspect of the present invention, the card (or cards) are able to communicate with the host in more than one protocol.

The exemplary embodiment is described in terms of a SD type removable electronic circuit card having both a memory module with a non-volatile mass storage memory and a separate input-output module. Each of the modules have their own controller, each of which is connected in parallel to the main card bus (the SD bus) by which the controllers can exchange commands and data with the host. Typically, each of the modules will have a differing set of legal commands: Although they may share some commands in common, for example a reset command, each will have a specific set of commands of its own. To facilitate this parallel connection of the controllers to the bus, the present invention introduces a set of controller-to-controller lines. In the exemplary embodiment, based on a card that can utilize both the SD or MMC protocol as well as the SPI protocol, three such line are used. These lines allow one controller to indicate to the other controller to ignore the data on the bus, that it is an acceptable time to issue an interrupt command, or to manage the setting and clearing of flags related to illegal commands. They also allow one controller to indicate to the other controller that it is attached and active, since the present invention may also be implemented in a multi-card embodiment where the other module may or may not be attached.

In a single card embodiment, all of the modules are contained in a single card conforming to a particular standard that is attachable to the host. In a multi-card embodiment, a first card (such as the memory card) is attachable to the host, but also includes a connector for the attachment of one or more additional cards, such as an input-output card. In the multiple card case, both the main card bus and the controller-to-controller interface would extend across the connectors interface, so that when the second card is attached it would operate in the same manner as the single card embodiment.

The exemplary embodiments are described for the modules being able to communicate with a host in multiple protocols, specifically, the SD, or MMC and the SPI protocols, although others may be uses. The controller-to-controller lines can have differing functions that depend upon which protocol is being used. As the controller-to-controller lines allow the parallel-connected modules to operate as a single entity as seen by the host, in the SD and MMC protocols, the modules all share a common relative card address (RCA), and in the SPI protocol, the modules are all responsive to the same chip select (CS) signal.

Additional details, features and advantages of the present invention will become apparent from the following description, which should be taken in conjunction with the accompanying drawings.

BRIEF DESCRIPTION OF THE DRAWINGS

FIGS. 1a and 1b illustrates systems in which a non-volatile memory module and an input-output module are utilized respectively in a combination card embodiment and two card embodiment.

FIG. 2 shows the pin assignments of an example card and system socket in which the card is inserted.

FIG. 3 is a block diagram of an exemplary combination memory/input-output card configuration.

FIG. 4a is a schematic representation of using line [A] in SPI mode for the I/O controller to indicate to the memory controller to ignore host data.

FIG. 4b is a schematic representation of using line [A] in SPI mode for the memory controller to indicate to the I/O controller to ignore host data.

FIG. 5 is a bus timing diagram for line [A] in SPI mode.

FIG. 6 is a table of timing diagram symbols.

FIG. 7 is a schematic representation of using line [A] in SD mode for the memory controller to indicate to the I/O controller valid interrupt periods.

FIG. 8 is a bus timing diagram for line [A] in SD wide bus mode.

FIG. 9 is a schematic representation of using line [B] in non-command response periods to indicate to the first card's controller that the second card is attached.

FIG. 10a is a schematic representation of using line [B] for the I/O controller to indicate to the memory controller that is responding.

FIG. 10b is a schematic representation of using line [B] for the memory controller to indicate to the I/O controller that is responding.

FIG. 11 is a bus timing diagram for sense and drive periods on line [B].

FIG. 12 is a block diagram of how one controller uses line [C] to indicate to another controller to set the illegal command flag.

FIG. 13 is a bus timing diagram for an illegal command to the memory controller followed by a legal one on line [C].

FIG. 14 is a bus timing diagram of line [C] used together with line [B] in order to control the card detect logic.

FIG. 15 is a table of exemplary bus timing diagrams.

FIG. 16 is a timing diagram of control line [A] in SD mode.

FIG. 17 is a timing diagram of control lines [B,C] in SD and SPI mode, line [A] in SPI mode.

FIG. 18 is a table of parameters for line [A] in SD mode.

FIG. 19 is a table of parameters for lines [B,C] in SD and SPI mode, line [A] in SPI mode.

FIG. 20 is a pin description for the controller to controller interface.

DESCRIPTION OF SPECIFIC EMBODIMENTS

With reference to FIG. 1a, host electronic system 31 is illustrated to include a socket 33 into which one or more types of commercially available removable electronic circuit card, such as the memory cards summarized in the Background above, may be inserted and removed by the user. The socket 33 may be built into the host 31 or physically separate and connected by a cable or cableless means. The host 31 may be a personal computer, in desktop or notebook form, which includes the socket 33 that receives such a card. Other examples of host systems containing such a card socket include various portable electronic devices, such as hand held computers, personal organizers, other personal digital assistants ("PDAs"), cellular telephones, music players, and the like. Additionally, auto radios and global position system ("GPS") receivers also can have such a memory card socket. The improvements of the present invention have application to a wide variety of host systems that include a memory card socket.

In the examples described herein, the SD card is described but it will be understood that the invention is not limited to implementation with any specific type of removable electronic circuit card. In FIG. 2, the physical configuration of a SD card 35 and a mating socket 33 are shown. The SD card is rectangular in shape, having dimensions of 24 millimeters by 32 millimeters, with a thickness of 2.1 millimeters and narrow rails (not shown in FIG. 2) along the longer sides of the card that are 1.4 millimeters thick. The present invention may be implemented with a card having one of a wide variety of sizes but has a high degree of usefulness with cards that are less than 51 millimeters in length, 40 millimeters in width and 3 millimeters in thickness.

The SD card 35 contains nine surface electrical contacts 10–18. Contacts 13, 14 and 16 are connected to power ($V_{SS}$, $V_{DD}$ and $V_{SS2}$) when inserted into the host system socket 33. Card contact 15 receives a clock signal (CLK) from the host. Contact 12 receives commands (CMD) from the host and sends responses and status signals back to the host. The remaining contacts 10, 11, 17 and 18 (DAT 2, DAT 3, DAT 0 and DAT 1, respectively) receive data in parallel for storage in its non-volatile memory and send data to the host in parallel from the memory. A fewer number of data contacts are selectable for use, such as a single data contact 17. The maximum rate of data transfer between the host and the card is limited by the number of parallel data paths that are used (and the maximum clock rate. The MMC card described in the Background above has a similar contact layout and interface but omits the data pins 10 and 18 and does not use the contact 11, which is provided as a spare. The MMC card has the same dimensions and operates similarly to the SD card except that the card is only 1.4 millimeters thick and has a single data contact 17. The contacts of the card 35 are connected through respective pins 20–28 of the socket 33 to its host system. Other extensions of memory cards that are compatible with the present invention are described in U.S. patent application Ser. No. 09/924,185 filed Aug. 2, 2001, which is hereby incorporated by reference.

The present invention is based on removable electronic circuit card, such as card 35 of the embodiment of FIG. 1a that includes, in addition to a memory module such as indicated at 36, an input-output module 37. The input-output module 37 may communicate directly with some other system 39 over a communications path 41. The communications path 41 can be wireless, such as by use of an infrared or radio frequency signal, or can include a wired connection. If by wires, the card 35 includes an external socket to removably receive a plug that is attached to the wires. If wireless, the card 35 includes an antenna within it, if using radio frequency communication, or an infrared emitter and detector, if infra-red communications is being used. An emerging standard for radio frequency data communication has been published as the Bluetooth Specification, which is discussed by Wilson and Kronz, in two articles entitled "Inside Bluetooth Part I" and "Inside Bluetooth Part II", appearing in the issues of *Dr. Dobb's Journal* for March, 2000 (beginning at page 62) and April 2000 (beginning at page 58), which articles are incorporated herein by this reference. Other wireless schemes include those based on the 802.11 protocol, such as WiFi, and ultra-wideband (UWB) technologies. The transfer of data over the communications path 41 will usually be in two directions but can certainly be limited to one direction or the other for specific applications.

In some applications, the incident signal 41 may not explicitly originate with an external system 39. For example, the input-output module 37 could contain a photosensor or lens integrated into the card in order to function as a camera module. In this case, the signal 41 would be the incident radiation and the card would form a stand-alone unit and would not need to interact through a cable or antenna with any entity but the host.

In the exemplary embodiment of FIG. 1a, the combination card 35 including the input-output module 37 is based on and compatible with the SD memory card as described in the Background. This compatibility includes mechanical, electrical, power, signaling and software. The intent of the combination card 35 is to provide high-speed data I/O with low power consumption for mobile electronic devices. A basic goal is that a combination card inserted into a non-combination card aware host will cause no physical damage or disruption of that device or its software. In this case, the I/O module functionality should simply be ignored. Once inserted into a combination card aware host, the detection of the card will be via the normal means described in version 2.11 of the MMC specification or U.S. patent application Ser. No. 09/641,023, both incorporated by reference above, with some extensions. In this state, the combination card will be idle and draw a small amount of power (15 mA averaged over 1 second). During then normal initialization and interrogation of the card by the host, the card will identify itself as a combination card device. The host software will then obtain the card information in a tuple (linked list) format and determine if the card's I/O function(s) are acceptable to activate. This decision will be based on such parameters as power requirements or the availability of appropriated software drivers. If the card is acceptable, it will be allowed to power up fully and start the I/O and function(s) built into it. More details on the operation of the exemplary embodiment of FIG. 1a is given in co-pending U.S. patent application Ser. No. 10/302,009, filed on Nov. 21, 2002, which is hereby incorporated by reference.

An alternate exemplary embodiment of the present invention is shown in FIG. 1b, where the memory module and input-output modules are on separate cards. The alternate exemplary includes modifying a memory card, such as the memory card 35, by adding a connector, such as indicated at 36 in FIG. 2, the modified card being identified as 35' in FIG. 1b. The connector 36 attaches to a mating connector of an input-output card 37 in order to mechanically and electrically couple the two cards together. Under this arrangement, although the second card 37 will conform functionally to the appropriate standard, such the SD or SD 10 card standard in the example, it need not necessarily conform mechanically, allowing the first card 35' to also serve as a physical adapter. The input-output card 37 communicates directly with some other system 39 over a communications path 41. More details on the operation of the exemplary embodiment of FIG. 1b, including the mechanical aspects of the card to card attachment, are given in co-pending U.S. patent application Ser. No. 09/653,062, filed Sep. 1, 2000, incorporated by reference above.

Although the exemplary embodiments of FIGS. 1a and 1b, as well as most of the following discussion, are based on two modules, specifically a memory module and an input-output module, more generally there can more modules distributed among a single card, as in FIG. 1a, or multiple cards, as in FIG. 1b. In either case, however, only one card will be attached to the host. For example, 35 of FIG. 1a can contain multiple I/O modules, or in FIG. 1b card 37 can contain multiple input-output modules or can have 35' can have multiple input-output cards attached. Generally, the various aspects of the present invention will be described for a single card connected to a host. The card will either contain multiple modules within the card itself (a "combo card") or have one or more cards, which themselves contain modules, connected to the host through it.

The exemplary embodiments will also be described for the case where the card (or cards) is able to communicate with the host through a plurality of protocols, such as is described in U.S. patent application Ser. No. 09/186,064 incorporated above. Specifically, these will be either the MMC or SD (described in version 2.11 of the MMC specification or U.S. patent application Ser. No. 09/641,023 both incorporated by reference above) protocol and the SPI protocol in the exemplary embodiment.

FIG. 3 is a block diagram of an exemplary embodiment for a combination card 35 conforming to the appropriate SD card standards and having a memory module and input-output module. In the memory module, only the controller 301 is explicitly shown and, similarly, only the controller 303 is shown in the I/O module. The I/O module (which can contain multiple I/O functions) is here designed to work together with the specific card type selected and complies with the appropriate specification as incorporated above. Also as noted above, the embodiment is taken to support both SD bus and SPI bus modes, as described in the incorporated references. The bus structure by which the modules exchange data and commands with the host is shown at 331. In particular, the bus conforms to the SD standard and includes a clock line CLK, a command line CMD, data lines DAT0–3, and power supply lines at Vdd and Vss. For a two card implementation, the broken line 307 indicates a boundary between a memory card (35') that connects to the host directly and an input output card (37)

that connects to the memory card. The bus 331 again extends through both cards and connects to both controllers.

The scope of the following discussion will mainly define the functional characteristics of the SD card with the I/O expansion slot, along with related electrical and timing issues. In the embodiment of FIG. 3, both the memory controller 301 and the I/O controller 303 are connected on the same bus for communicating with the host. Thus each module would be able to independently communicate with the host, but the host still sees only a single card. For the exemplary protocols, this results in only a single relative card address (RCA) being defined for the card in SD or MMC mode and only single chip select (CS) signal being used for the card in SPI mode, even though the card (or cards) will contain more than a single module. To facilitate the operation of multiple modules connected in parallel to the host while still allowing the host to see them as a single card, the connection 333 is implemented between the two controllers.

The exemplary connection has three control lines, A, B, and C through which the controllers can exchange signals to allow the modules to sort out which commands and data from the host are meant for which module. As both modules are identified by the host by the same relative card address (RCA) or chip select (CS) signal, but many commands are specific to just one module, the control lines allow the modules to facilitate these host interactions. For example, if the host sends a command specific to the I/O module followed by some data, the memory module would interpret the command as illegal. Instead, the control lines 333 allow the I/O controller 303 to inform the memory controller 301 that the command is not illegal, but, rather, intended for the I/O module and that the memory module should ignore the following data. In the exemplary embodiment, it will be assumed that most commands are specific to one module or the other, with a small number of commands shared in common. Examples of such common commands are a card reset command, commands related to establish a RCA for the card as a whole, commands related to CS signals, and other commands that allow the largely independent modules to function as a single card as viewed from the host. Other commands may also be common to both modules, such as commands related to DMA type transfers between the modules that are described further in patent application Ser. No. 10/302,009.

The interface control lines will be described in more detail, beginning with line [A]. Line [A] is also labeled INT_PER_IGNOR_DI on FIG. 3 and has a dual functionality, depending on whether the communication is in SD mode, where it functions as a VALID MEMORY INTERRUPT PERIOD line, or in SPI mode, where it function as a IGNORE DI INPUTS line. In SPI mode, data and commands/responses are sent serially, coming in on the CMD (now the data in, or DI) line and out on the DAT0 (now the data out, or DO) line. As both modules are connected in parallel, both modules are listening in on the SD bus 331 and data/commands sent to one module might be interpreted by the wrong module. Line [A] in the SPI mode is used one controller to indicate to the other controller to ignore DI input. Default is implemented as pull-up mode. "0" set by one of the controllers (IO or Memory) indicates to the other controller to ignore DI input. The reason for control line [A] is that the data that was sent to one controller may be interpreted as a command by the other controller. Since both controllers will not receive data on the same time, the same control line [A] will be used from I/O to Memory and from Memory to I/O.

FIG. 4a is an example for indication from the I/O controller to the Memory controller to ignore DI. The I/O controller receives a command that will be followed by a DATA reception, so the I/O controller starts to assert line [A] to zero $TA_{RI}$ clocks after the last bit of the command response. The I/O controller will release line [A] TABS clocks (defined in FIG. 5) after the last busy bit. The Memory controller sense the 'low' on line [A] and from now on the memory controller will ignore DI input until the I/O controller releases line [A].

FIG. 4b is an example for indication from the Memory controller to the I/O controller to ignore DI. The Memory controller receives a command that will be followed by a DATA reception, so the Memory controller starts to assert line [A] to zero $TA_{RI}$ clocks after the last bit of the command response. The Memory controller will release line [A] $TA_{BS}$ clocks after the last busy bit. The I/O controller sense the 'low' on line [A] and from now on the I/O controller will ignore DI input until the Memory controller releases line [A]. An example of line [A] bus timing in SPI mode is shown in FIG. 5, with diagram symbols defined in Table 1 of FIG. 6.

In SD mode, line [A] is used for a sending a VALID MEMORY INTERRUPT PERIOD signal from the memory module to the I/O module, as shown in FIG. 7. This signal indicates that the I/O controller 303 is allowed to send an interrupt to the host according to the SD bus protocol, since if the I/O module sends an interrupt to the host on the bus 331 at a non-allowed time, this may corrupt data being exchanged between the memory module and the host. The I/O controller 303 must check this line before sending interrupt to the host. "1" indicates valid Interrupt period and "0" indicates a non-valid interrupt period. As described in the various references incorporated above, in SPI and 1-bit (or narrow) SD mode Pin 8 (DAT1) is used as interrupt signal. In 4-bit (or wide) SD mode Pin 8 (DAT1) is used for data transfers and for interrupt signal. Line [A] is used to prevent bus contention on Pin 8 while working in 4-bit SD. Line [A] indication from the memory to the I/O has special timing as follows:

1) In 1-bit (narrow) SD mode, line [A] is always 'high'.
2) In 4-bit (wide) SD mode the interrupt period will start $TA_{IP}$ clocks after line [A] goes to 'high'. Interrupt period will be finished $TA_{SE}$ clocks after line [A] goes to 'low'. In the first 2 clocks the I/O controller will drive 'low', on the 3rd clock the I/O controller will drive 'high', on the 4th clock the I/O controller will stop to drive the interrupt signal.

The line [A] bus timing for a read command in wide bus SD mode is shown in FIG. 8. The memory controller does not support interrupt periods between data blocks in the 4-bit data transfer mode.

Line [B] is also labeled CMD_RESP_IO_DET on FIG. 3 and also has more than one functionality, depending on whether the device is in a command response period, where it functions as a command response indication line, or is not in a command response period, where it function as a I/O card detection line. As shown schematically in FIG. 9, during non-command response periods, the memory controller is in input mode on line [B], which is used by the I/O controller to indicate that I/O card is present. Of course, in single card embodiments, the I/O module will always be present as it is on the same card; but in cases where a module is on a separate card, such as 37 in FIG. 1b, this allows the card that is directly connected to host (i.e., 35') to know that the second card (i.e., 37) is attached. Otherwise, if there is no response on bus 331 to a command, it would not be clear to the controller 301 whether the card 37 was absent, or whether controller 303 was just not responding. The I/O card's controller 303 drives line [B] 'low' at all times except for one clock after the end bit of command until some number of clocks after the end of the command. This period is referred as 'response period' in the following. In case that the I/O card is not connected the line is pulled up. In order to eliminate marginal timing problems the memory controller will consider line [B] as I/O card detection indication a few clocks after the end of the response period.

During a command response period, line [B] is used to by one controller to indicate to the other controller that is responding and that the other controller need not respond. This helps to manage traffic on the system bus and keeps both controllers from responding at the same time. During a command response period, line [B] indicates that a command is responded to in both SD and SPI modes. In default, the memory and I/O controllers are in input mode. By driving line [B] 'low' by one of the controllers (I/O or memory) indicates to the other controller that the driving controller is sending a command response. This process is shown schematically in FIGS. 10a and 10b for the I/O controller 303 responding and the memory controller 301 responding, respectively. FIG. 11 shows an exemplary timing diagram for sense and drive periods on line [B].

A controller that sends a response to the host also clears any previously set error and illegal command flags as part of the response process. Line [B] indicates to the other controller to clear its error and illegal command flags, so that this knowledge can be shared by the two controllers. In an exemplary embodiment, a line [B] indication is for a period of 4 clocks, starting half bit before the start bit of the command response (see FIG. 14). The response of the I/O controller can then start in the period of 2 clocks after the end bit of command, until 32 bits after the end bit of the command and the response of the memory controller can start in the period of 2 clocks after the end bit of command until 16 bits after the end bit of the command.

In an additional functionality described below, line [B] can be used together with line [C] in order to control the card detect logic.

Line [C] is also labeled ILLEG_CMD on FIG. 3, is used in SD mode, and has a dual functionality. According to the SD specification, if an illegal command is sent to a controller, on the next command it will indicate that the command was previous command was illegal. The illegal command flag also sets a flag so that this information can be sent on the next (legal) command. However, this next command may not be directed to the same module, so this illegal command information needs to be shared between the controllers. For example, the illegal command may be to the memory module, whereas the next, legal command is to the I/O module that would otherwise have no knowledge of the preceding illegal command. This process is shown schematically in FIG. 12. (The clearing of this illegal command flag was described above with respect to line [B].)

More specifically, in default, the memory and I/O controllers are in input mode. When one of the controllers detects illegal command reception, the controller will set the illegal command flag. Line [C] will be driven to 'low' $TC_{EI}$ clocks after end bit of the illegal command, in order to signal the other controller to set its illegal command flag. When one of the controllers detects an illegal command reception the controller will check line [C]: If line [C] is 'high' the controller will drive line [C] to 'low', while if line [C] is 'low' (that is, the other controller is already driving the line [C]) the controller will not drive the line.

The controller that drives line [C] to 'low' will stop driving line [C] in two scenarios:

1) During the process of sending a response to a legal command, the controller clears the illegal command flag. Line [C] is released after the reception of the legal command up to $TC_{RS}$ cycles after the start bit of the response to signal that the illegal command flag is cleared. FIG. 13 is an example a memory controller that receives an illegal command and start driving line [C] to 'low'. (Exemplary bus timing values of FIGS. 13 and 14 and shown in Table 2 of FIG. 15.) After receiving a legal command the memory controller stops driving line [C]. The same process is followed by an I/O controller that receives legal command after an illegal command.

2) After receiving an illegal command the controller sets the illegal command flag and drives line [C] to 'low'. If the next legal command is accepted by the other controller, the other controller will drive line [B] to 'low' in order to signal the first controller to clear the illegal command and error flags. The first controller will release line [C] $TC_{BS}$ clocks after the falling edge of line [B] and clear the error flag. FIG. 14 is an example a memory controller that receives an illegal command and start driving line [C] to 'low'. After receiving a legal command by the I/O controller, the I/O controller start driving line [B], and as a result the memory controller clears the error flags and stop driving line [C]. The same process is followed by a memory controller that receives legal command after an illegal command that was sent to the I/O controller.

The electrically characteristics of the controller to controller connections are described in more detail in FIGS. 16–20. FIG. 16 is a timing diagram of control line [A] in SD mode, with Table 3 of FIG. 18 giving the various parameters in FIG. 16. FIG. 17 is a timing diagram of control lines [B,C] in SD and SPI mode, line [A] in SPI mode, with Table 4 of FIG. 19 giving the various parameters in FIG. 17. FIG. 20 gives a pin description summarizing the controller-to-controller interface.

Although the various aspects of the present invention have been described for the case of two modules, specifically a memory module and an input-output module, the invention also extends other numbers and types of modules whose controllers are independently connected to the system bus in parallel while still appearing to the host as a single, single module card. Also, as already noted, these modules may be within a single card (as in FIG. 1a) or distributed across multiple cards (as in FIG. 1b). In multiple card embodiments, both the system bus (331, FIG. 3) and the controller-to-controller interface (333, FIG. 3) will extend across the card-to-card connection. Additionally, the present invention also extends to cases where, in a multi-card embodiment such as FIG. 1b, the card attaching to the lacks a controller. For example if card 35' of FIG. 3 lacks controller 301, the lines [A–C] are then set to Vss in card 35. This allows card 35' to act as an adapter for card 37 to attach to the host.

In another set of aspects of the present invention, the card system can operate in multiple protocols. The exemplary embodiment is described for two such protocols, although more generally, either more protocols or only a single protocol can be used. The exemplary protocols are the SD or MMC protocol and the SPI protocol, which are described in more detail in version 2.11 of the MMC specification or U.S. patent application Ser. No. 09/641,023, both incorporated by reference above. Within this exemplary embodiment, a more detailed description is given of the requirements for the memory controller and the usage of the A, B and C control lines in a various cases. The requirements from the I/O controller are described as well in order to clarify the operation concepts.

In SPI mode, it is defined in the physical specification that a card will respond to all commands, even to illegal commands. In a combination memory/input-output card, the memory controller will ignore the I/O specific commands. Similarly, the I/O controller will ignore memory specific commands. In multi-card embodiments, where the IO controller is not connected (detected with line [B]), the Memory Controller will not ignore the I/O related commands, but instead respond as illegal commands if they will be sent to it. In SPI mode it is defined in the SD physical specification that the card shall drive 'high' on the DO pin (DAT0) in case that the CS is asserted. In the multi-module situation, each controller will enable the output of its own DO only when it is required (i.e., responding to a command or sending data), otherwise it will be in Input mode. The host will keep the line high as described in the specification. From the host's point of view, the card/bus continue to behave the same as it is defined in the specification for a single module card.

As both controllers are connected in parallel to the SD bus, the data that is sent to one controller may be interpreted as a command by the other controller. The probability for this misinterpretation becomes even higher if the cycle redundancy check (CRC) is not used, which is legal in SPI mode. (As described, for example in the referenced MMC specification, in the preferred embodiment, every SD or MMC token transferred on the SD bus is protected by CRC bits, while for SPI mode, a non-protected mode is available that enables systems built with reliable data links to exclude the hardware or firmware required for implementing the CRC generation and verification functions.) That is the reason for having control line [A] between the Memory and IO controllers. In the exemplary embodiment, both controllers will not receive data at the same time and the same control line [A] will be used from I/O controller to memory and from memory controller to I/O controller. Each side will drive assert ('low') the line in case of data reception, with a pull-up resistor keeping the line high in other states.

In order to get into the SPI mode, the host sends CMD0+ (CS=0) for both the I/O and memory modules, even though the RESET commands can be different for the memory and I/O controllers with, for example, the I/O module having a reset command other than CMD0. The I/O controller will get into SPI mode but will not respond to CMDO command. The command to turn cycle redundancy check (CRC) on and off, CRC_ON_OFF will be responded by the memory controller and not by the I/O controller, since this is a legal command for the Memory. The I/O controller should identify this command and enable or disable the CRC check function according to the command argument. In case that a command CRC error is detected (and CRC detection is Enabled), then in both controllers an error flag will be set. If both cards are initialized then both would like to respond. The I/O controller will respond only if a response from the memory controller did not appear within a specified number of, say 16, clocks, during which the I/O controller will 'listen' to line [B]. If the I/O module detects a response from the memory controller during the given period, then it will only reset its CRC error flag and will not itself respond. Similarly, in case that one of the controllers detects an illegal command, it will respond with an Illegal Command response.

In the SD mode, the combination memory/input-output card, the memory controller will ignore the I/O specific commands. Conversely, the I/O controller will ignore all commands that are out of the I/O command class, unless they are common to all controllers (Class 9) except the common commands (such as reset (CMD0) and commands related to relative card address (RCA) and chip select (CS)). In case that the I/O controller is not connected (detected with line [B]), then the memory controller will not ignore the I/O related commands—in other words, it will respond as if illegal commands were sent to it.

The memory controller will response to the commands related to establishing a relative card address (RCA) when the command is legal. In this case the I/O controller will 'listen' for appropriate command response on the CMD line. If a valid response (with correct CRC) is detected within a set number of clocks (and the command is legal for the I/O controller), the I/O controller will adopt the RCA. Line [B] will signal the I/O controller that the memory controller is responding.

The memory controller will response to RCA establishing command when it is legal. In this case the I/O controller will 'listen' for the command response on the CMD line. If a valid response (with correct CRC) is detected within the prescribed number of clocks (and the command is illegal for the I/O controller), the I/O controller will not adopt the RCA, and will not set the illegal command flag. Line [B] will signal the I/O controller that the memory controller is responding.

If the memory controller is not responding within the allowed response time from the end bit of RCA establishing command, and the command is legal for the I/O controller, the I/O controller will response. The memory controller will. 'listen' for the response on the CMD line. If a valid RCA results, then the I/O controller will adopt the RCA if needed. Line [B] will signal the memory controller that the I/O controller is responding. If, instead the memory controller is not responding within the allowed response time and the command is not legal for the I/O controller, the I/O controller will not response. The I/O controller will set the illegal command flag, and will use line [C] to signal the memory controller that illegal command was detected.

The process for the commands related to chip select (CMD7), which are again common for all of the modules so that they will function as a single card as seen from the host, will be treated similarly to that described in the preceding paragraphs for the commands used to establish a relative card address (CMD3).

When the host is transferring data to/from the memory module, an interrupt can occur from the I/O module. In order to allow transmission of the interrupt only during the valid periods, the memory controller signals the valid memory interrupt period to the I/O through line [A]. An Interrupt Period indication will precede the 'real' interrupt period, allowing the period to be very accurate. That is done to provide an allowance for path delay between the memory controller to the I/O controller (through pad delays, connector delays, and so on).

When a command has a CRC error, the corresponding error flag is set in both controllers and neither will respond. According to the SD specification, the response to the following command indicates the CRC error bit and the CRC error flag is responded to with the following command response of the card. The CRC flag will be cleared in a given controller in either of the following cases: 1) The controller is responding with CRC error; or 2) during the response periods the controller detects on line [B] a command response indication from the other controller in the card.

If an Illegal command is detected by one of the controllers, it sets it own Illegal Command flag and does not respond. According to the SD specification, the response to the following command shall indicate the Illegal Command Error. Therefore the other controller will set its Illegal Flag as well by using line [C]. The controller whose illegal flag was set will drive line [C] with "0". The other controller will set its Illegal Flag in case that change to "0" is detected on line [C]. Subsequently, both controllers behave as described in the last paragraph for the case of a CRC error. The Illegal Command Flag is responded to with the following command response of the card. The Illegal Command Flag is cleared in either of the cases: 1) The controller is responding with Illegal Command Flag; or 2 during the response periods the controller detects on line [B] a command response indication from the other controller in the card. Both cards set their line [C] drivers to input mode whenever they clear their Illegal Command flag. A set of 'rules' for each of the controllers about the line [C] can be summarized as follows:

- a) Assert line [C] to 'low' in case that sets its own Illegal Flag (after Illegal Command was receipted).
- b) De-assert (go to input mode) line [C] when clear its own Illegal Flag.
- c) Sets Illegal Flag if either—Illegal Command was detected OR change from "1" to "0" was detected in line [C].
- d) Clear Illegal Flag if either—Responding with Illegal command flag (R1, R5 or R6 in SD mode or R1, R2, R3 or R5 in SPI mode) OR detects CMD RESPOND on line [B] during the response period.

Although various aspects of the present invention have been described with respect to specific embodiments, it will be understood that the invention is protected within the full scope of the appended claims.

What is claimed is:

1. An electronic card connectable to a host system, the card comprising:
    a first module including a first controller;
    a second module including a second controller;
    a bus structure connected to both the first controller and the second controller in parallel, whereby data and commands can be exchanged between a host and the first and second modules when the card is connected to the host; and
    one or more control lines connected between the first controller and the second controller to exchange signals whereby the two modules can interact independently with the host while appearing as a single unit to the host, wherein when the card is connected to the host, both of said modules are identified by the same relative card address.

2. An electronic card connectable to a host system, the card comprising:
    a first module including a first controller;
    a second module including a second controller;
    a bus structure connected to both the first controller and the second controller in parallel, whereby data and commands can be exchanged between a host and the first and second modules when the card is connected to the host; and
    one or more control lines connected between the first controller and the second controller to exchange signals whereby the two modules can interact independently with the host while appearing as a single unit to the host, wherein the control lines allow one of said controllers can indicate to the other controller to ignore data on the bus structure.

3. An electronic card connectable to a host system, the card comprising:
    a first module including a first controller;
    a second module including a second controller;
    a bus structure connected to both the first controller and the second controller in parallel, whereby data and commands can be exchanged between a host and the first and second modules when the card is connected to the host; and
    one or more control lines connected between the first controller and the second controller to exchange signals whereby the two modules can interact independently with the host while appearing as a single unit to the host, wherein the control lines allow one of said controllers can indicate to the other controller an acceptable period for issuing an interrupt signal.

4. An electronic card connectable to a host system, the card comprising:
    a first module including a first controller;
    a second module including a second controller;
    a bus structure connected to both the first controller and the second controller in parallel, whereby data and commands can be exchanged between a host and the first and second modules when the card is connected to the host; and
    one or more control lines connected between the first controller and the second controller to exchange signals whereby the two modules can interact independently with the host while appearing as a single unit to the host, wherein the control lines allow one of said controllers can indicate to the other controller reception of an illegal command.

5. The card of claim 4, wherein the control lines allow one of said controllers can indicate to the other controller to clear an illegal command flag.

6. An electronic card connectable to a host system, the card comprising:
    a first module including a first controller;
    a second module including a second controller;
    a bus structure connected to both the first controller and the second controller in parallel, whereby data and commands can be exchanged between a host and the first and second modules when the card is connected to the host; and
    one or more control lines connected between the first controller and the second controller to exchange signals whereby the two modules can interact independently with the host while appearing as a single unit to the host, wherein the control lines allow one of said controllers can indicate to the other controller to clear an error flag.

7. An electronic circuit card system comprising:
    a first card connectable to a host, the first card including a first controller;
    a second card connectable to the first card, the second card including a second controller;
    a bus structure connected to both the first controller and the second controller in parallel when the first and second cards are connected, whereby data and commands are exchanged between the host and the first and second controllers when the cards are connected and the first card is connected to the host; and
    one or more control lines connected between the first controller and the second controller to exchange signals when the first and second cards are connected, whereby the two cards can interact independently with the host while appearing as a single card to the host, wherein when the first card is connected to the host and the second card is connected to the first card, both of said cards are identified by the same relative card address.

8. An electronic circuit card system comprising:
a first card connectable to a host, the first card including a first controller;
a second card connectable to the first card, the second card including a second controller;
a bus structure connected to both the first controller and the second controller in parallel when the first and second cards are connected, whereby data and commands are exchanged between the host and the first and second controllers when the cards are connected and the first card is connected to the host; and
one or more control lines connected between the first controller and the second controller to exchange signals when the first and second cards are connected, whereby the two cards can interact independently with the host while appearing as a single card to the host, wherein the control lines allow one of said controllers can indicate to the other controller to ignore data on the bus structure.

9. An electronic circuit card system comprising:
a first card connectable to a host, the first card including a first controller;
a second card connectable to the first card, the second card including a second controller;
a bus structure connected to both the first controller and the second controller in parallel when the first and second cards are connected, whereby data and commands are exchanged between the host and the first and second controllers when the cards are connected and the first card is connected to the host; and
one or more control lines connected between the first controller and the second controller to exchange signals when the first and second cards are connected, whereby the two cards can interact independently with the host while appearing as a single card to the host, wherein the control lines allow one of said controllers can indicate to the other controller an acceptable period for issuing an interrupt signal.

10. An electronic circuit card system comprising:
a first card connectable to a host, the first card including a first controller;
a second card connectable to the first card, the second card including a second controller;
a bus structure connected to both the first controller and the second controller in parallel when the first and second cards are connected, whereby data and commands are exchanged between the host and the first and second controllers when the cards are connected and the first card is connected to the host; and
one or more control lines connected between the first controller and the second controller to exchange signals when the first and second cards are connected, whereby the two cards can interact independently with the host while appearing as a single card to the host, wherein the control lines allow one of said controllers can indicate to the other controller reception of an illegal command.

11. The electronic circuit card system of claim 10, wherein the control lines allow one of said controllers can indicate to the other controller to clear an illegal command flag.

12. An electronic circuit card system comprising:
a first card connectable to a host, the first card including a first controller;
a second card connectable to the first card, the second card including a second controller;
a bus structure connected to both the first controller and the second controller in parallel when the first and second cards are connected, whereby data and commands are exchanged between the host and the first and second controllers when the cards are connected and the first card is connected to the host; and
one or more control lines connected between the first controller and the second controller to exchange signals when the first and second cards are connected, whereby the two cards can interact independently with the host while appearing as a single card to the host, wherein the control lines allow one of said controllers can indicate to the other controller to clear an error flag.

* * * * *